United States Patent
Dorst

(10) Patent No.: US 12,001,372 B2
(45) Date of Patent: Jun. 4, 2024

(54) AUTONOMOUS ENTRY AND EXIT OF LOW LATENCY DATAPATH IN PCIe APPLICATIONS

(71) Applicant: Avago Technologies International Sales Pte. Limited, Singapore (SG)

(72) Inventor: Jeffrey Ronald Dorst, Austin, TX (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 136 days.

(21) Appl. No.: 17/694,106

(22) Filed: Mar. 14, 2022

(65) Prior Publication Data

US 2023/0289315 A1    Sep. 14, 2023

(51) Int. Cl.
G06F 13/24   (2006.01)
G06F 9/30    (2018.01)
G06F 13/42   (2006.01)

(52) U.S. Cl.
CPC ...... *G06F 13/4221* (2013.01); *G06F 9/30123* (2013.01)

(58) Field of Classification Search
CPC .......................... G06F 13/4221; G06F 9/30123
See application file for complete search history.

(56) References Cited

U.S. PATENT DOCUMENTS

| | | | |
|---|---|---|---|
| 10,095,653 B2 | 10/2018 | McGowan | |
| 10,606,793 B2 | 3/2020 | Sharma | |
| 10,747,688 B2 | 8/2020 | Jen et al. | |
| 11,150,687 B1 | 10/2021 | Mohan et al. | |
| 11,159,353 B1 | 10/2021 | Chen et al. | |
| 11,726,660 B1* | 8/2023 | Hadav | G06F 3/0673 710/74 |
| 2017/0351640 A1 | 12/2017 | Nilange et al. | |
| 2017/0371831 A1* | 12/2017 | Das Sharma | G06F 13/4291 |
| 2018/0181525 A1* | 6/2018 | Iyer | G06F 13/382 |
| 2018/0225233 A1 | 8/2018 | Sharma | |
| 2018/0253398 A1* | 9/2018 | Wu | G06F 15/173 |
| 2019/0258600 A1 | 8/2019 | Sharma | |
| 2021/0089421 A1 | 3/2021 | Sharma et al. | |
| 2021/0263879 A1* | 8/2021 | Li | G06F 13/4072 |
| 2021/0342288 A1 | 11/2021 | Sharma | |

OTHER PUBLICATIONS

Astera Labs., "Aries PCIe®/CXL™ Smart Retimers", URL: https://www.asteralabs.com/products/smart-retimers/pcie-cxl-smart-retimers/, Downloaded Dec. 16, 2021, 1 page.

* cited by examiner

*Primary Examiner* — Henry Tsai
*Assistant Examiner* — Kim T Huynh
(74) *Attorney, Agent, or Firm* — Quarles & Brady LLP

(57) ABSTRACT

A PCIe retimer includes read-only vendor registers with low latency mode entry and exit values. In-band low latency switching logic monitors the output of an elastic buffer for read commands of the vendor registers and, when such read commands are received, reads the corresponding address and switches a multiplexer between a link training data path and a low latency data path based on the return value of the read operation. Read commands, and therefore control of data path switching, is handled entirely in-band. Return values of the read operations indicate success or failure of mode switching to the root complex.

20 Claims, 4 Drawing Sheets

AUTONOMOUS ENTRY AND EXIT OF LOW LATENCY DATAPATH IN PCIe APPLICATIONS

FIELD OF THE INVENTION

Embodiments of the inventive concepts disclosed herein are directed generally toward retimers, and more particularly to PCIe retimers with in-band low latency switching.

BACKGROUND

Where a peripheral component interface express (PCIe) bus passes through a connector to a cable or to a printed circuit board (PCB) (i.e. mid-plane or back-plane layouts), the interconnect and PCB/cable changes cause discontinuities, and those discontinuities produce reflections and increase inter-symbol-interference that degrade the PCIe signal. Without active circuitry, the receiver may be unable to read the degraded signal. The PCIe base specification allows for up to two retimers (the active circuitry that regenerates the PCIe signal), implemented in series, to extend the range of the physical bus.

Retimers need to have a full PCIe physical layer stack to participate fully during link training and to manipulate bits in ordered sets. An incoming packet traveling the physical layer stack first traverses the receiver side serial-to-parallel logic, descrambler, decoding, elastic buffer, alignment decoder deskew buffer, and other receiver logic before traversing the transmitter side encoding, scrambling, and parallel-to-serial logic. Existing PCIe retimers have a one-way latency in the range of 30-50 nanoseconds for traffic flowing through the retimer in each direction for a round-trip latency through a single retimer in the range of 60-100 nanoseconds. In systems with two retimers, the round-trip latency can be as much as 120-200 nanosecond. Some applications see performance degradation due to added latency.

SUMMARY

In one aspect, embodiments of the inventive concepts disclosed herein are directed to a PCIe retimer having read-only vendor registers with low latency mode entry and exit values. In-band low latency switching logic monitors the output of an elastic buffer for read commands of the vendor registers and, when such read commands are received, reads the corresponding address and switches a multiplexer between a link training data path and a low latency data path based on the return value of the read operation. Read commands, and therefore control of data path switching, is handled entirely in-band.

In a further aspect, return values of the read operations indicate success or failure of mode switching to the root complex.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
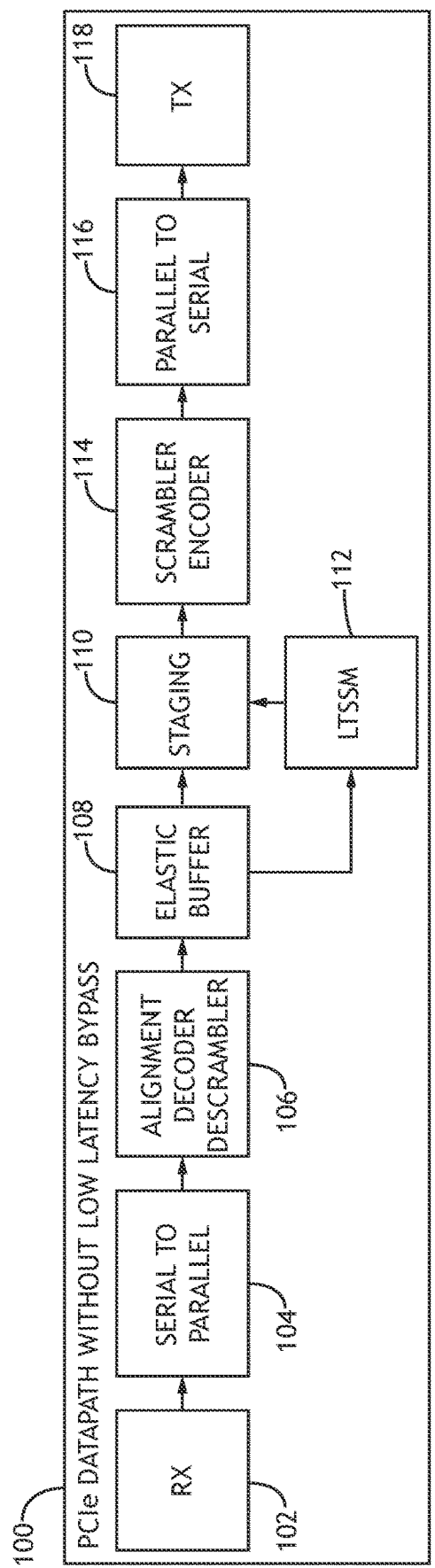
FIG. 1A shows a block diagram of a retimer data path.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a PCIe retimer having in-band read-only vendor registers with low latency mode entry and exit values. In-band low latency switching logic monitors the output of an elastic buffer for read commands of the vendor registers and, when such read commands are received, reads the corresponding address and switches a multiplexer between a link training data path and a low latency data path based on the return value of the read operation. Read commands, and therefore control of data path switching, is handled entirely in-band. It may be appreciated that handling data path switching in-band refers to signals or data packets that initiate the switch between the link training data path and the low latency data from within the link training data path. Return values of the read operations indicate success or failure of mode switching to the root complex, the PCIe hierarchy element that interfaces with a central processing unit (CPU) and memory subsystems.

Figure 1B:
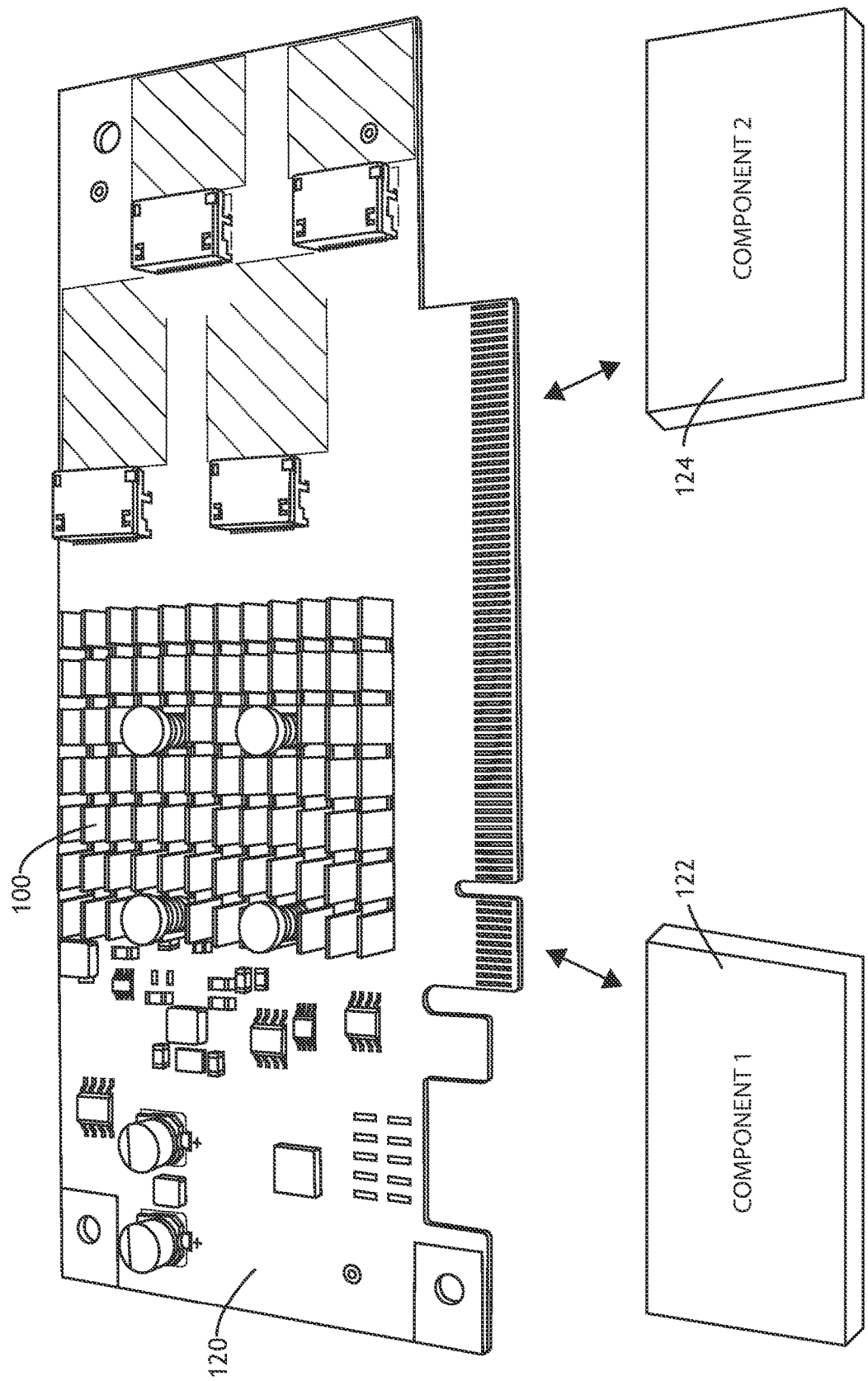
FIG. 1B shows a perspective, environmental view of a PCIe retimer suitable for an exemplary embodiment.

Referring to FIGS. 1A and 1B, a block diagram of a retimer data path and an environmental view of a retimer are shown. Existing retimers include a receiver 102 for receiving and transferring data between two devices (for example, a first component 122 and second component 124, each with PCIe interfaces) via a transmitter 118. The receiver 102 and transmitter 118 are coupled via a first data path for protocol specific training (e.g., link training). The protocol specific training enables transmitter 118 and receiver 102 to transfer data between the two devices according to the protocol of the link between them. The retimer 100 receives the signal, extracts the digital data component, and regenerates the signal as a separately trained link, in both directions. Therefore, the noise and other imperfections such as jitter will be eliminated.

Protocol specific training comprises link training and initialization. Such link training comprises performing an equalization procedure that generates transmitter equalization coefficients to control equalization performed by the transmitter 118, such as, for example, cursor coefficients to determine the level of de-emphasis and preshoot. Likewise, the equalization procedure generates receiver equalization coefficients for receive-side equalization in the form of continuous time linear equalization (CTLE) and decision feedback equalization (DFE).

During link training, a signal from the receiver 102 is converted via serial-to-parallel logic 104 to parallel data or bit registers. Based on the protocol associated with the data, the parallel data may undergo bit alignment, decoding and descrambling via an alignment/decoder/descrambler 106. Furthermore, due to the speed at which the data is being received, the data may need to be unscrambled. Also, the bits may need to be decoded; for example, the data may need to undergo 8b/10b decoding or another type of decoding. Finally, the alignment/decoder/descrambler 106 may align the data bits to determine when symbols in the stream of bits begin. In at least one embodiment, one or more functions of the alignment/decoder/descrambler 106 may be unnecessary depending on the protocol. The resultant data is stored in elastic buffer 108.

The elastic buffer 108 may act as a drift buffer for protocols (such as, for example, UPI, USB, Thunderbolt, and the like). The elastic buffer 108 compensates for bit streams that are being transmitted according to clocks that do not match domain of the transmitter 118. The data from the elastic buffer 108 is sent to a staging buffer 110 and an at least one link training and status state machine (LTSSM) 112, each configured according to a known protocol. The LTSSM 112 performs bit stream detection, ordered set generation, and bit stream modification that are associated with PCIe.

The LTSSM 112 is a state machine that defines link connectivity and link power management between host and target devices. The training process comprises checking and storing power load capacity determining what should and can be transmitted on each lane (a handshake). Once the handshake is done, the host and target devices can freely send and receive information.

Data for transmission from the LTSSM 112 and data from elastic buffer 108 are received by a staging buffer 110, which outputs either the LTSSM 112 data or elastic buffer 108 data depending on a control signal. The data for transmission from the staging buffer 110 undergoes scrambling and encoding via a scrambler/encoder 114 as dictated by the protocol being used, and conversion to a serial format via parallel-to-serial logic 116. The serial data is output to a transmitter 118. In at least one embodiment, the LTSSM 112 may be stored in a memory and implemented by a general-purpose processor.

Figure 2:
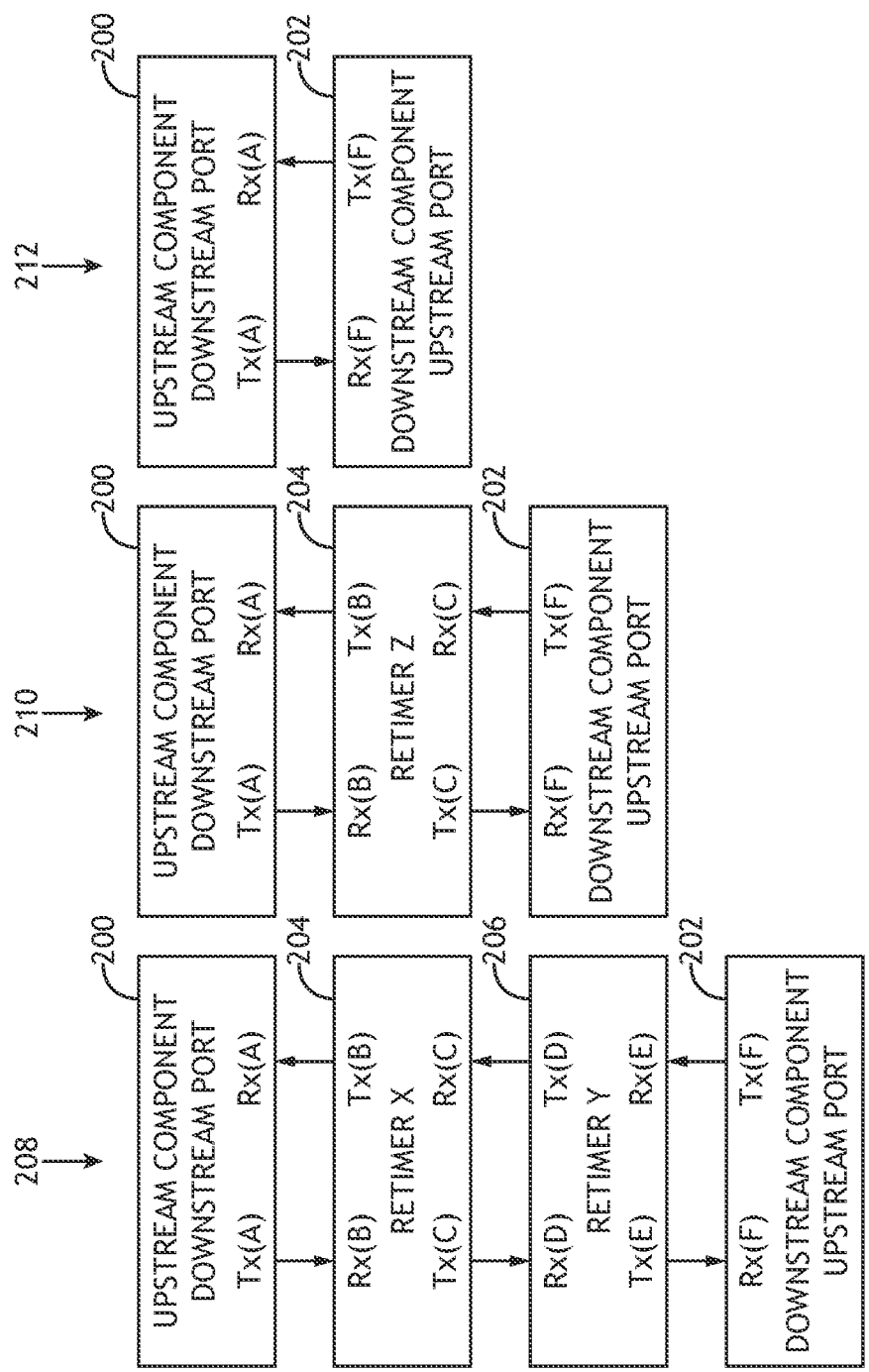
FIG. 2 shows link pathways having zero, one, or two retimers.

The retimer 100 boosts signals across a PCIe interconnect but will introduce significant latency. Multiple retimers 100 may exacerbate latency. Referring to FIG. 2, link pathways having zero, one, or two retimers 204, 206 are shown. In a first configuration 212, an upstream component 200 directly connects to a downstream component 202 with no added latency. However, where necessitated by signal degradation from interconnects, a first retimer 204 may be interposed between the upstream component 200 and downstream component 202 to regenerate the signal between an upstream component transmitter and downstream component receiver, and vice-versa. Furthermore, in some configurations, a second retimer 206 may be interposed between the first retimer 204 and the downstream component 202 to further extend signal range via a second signal regeneration.

Every signal regeneration introduces same level of latency. Retimers 100, 204, 206 introduce latency because of the processing necessary for training during each signal regeneration. Latency could be reduced or substantially eliminated if, after training for a specific protocol and upstream component 200/downstream component 202 combination, the processing steps could be bypassed.

Figure 3:
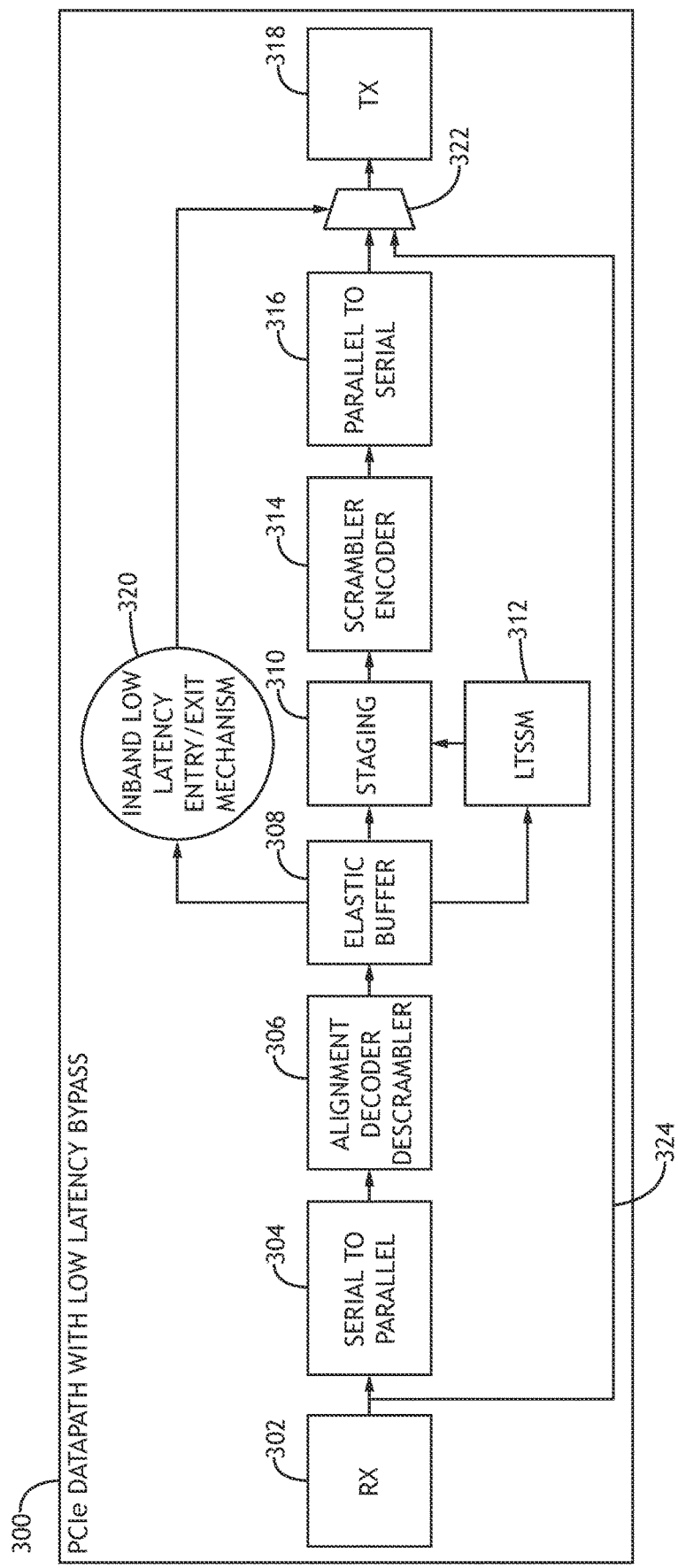
FIG. 3 shows a block diagram of a retimer data path according to an exemplary embodiment of the present disclosure.

Referring to FIG. 3, a block diagram of a retimer 300 data path according to an exemplary embodiment of the present disclosure is shown. During an initial training phase, such as when a first signal needing regeneration is received, a signal from the receiver 302 is converted via serial-to-parallel logic 304; bits are aligned, decoded and descrambled via an alignment/decoder/descrambler 306; and the resultant data is stored in elastic buffer 308. The data from the elastic buffer 308 is sent to a staging buffer 310 and at least one LTSSM 312. Data for transmission from the LTSSM 312 and data from elastic buffer 308 are received by a staging buffer 310, which outputs either the LTSSM 312 data or elastic buffer 308 data for scrambling and encoding via a scrambler/encoder 314, and conversion to a serial format via parallel-to-serial logic 316. The serial data is output to a transmitter 318.

Once initial link training is complete, in-band low latency switching logic 320 controls switching of a multiplexer 322. The multiplexer 322 switches data flow to a low latency data path 324 that bypasses any the training components, and sends data to the transmitter 318 directly. In at least one embodiment, the in-band low latency switching logic 320 includes a vendor register configured with a bit configured to signal the in-band low latency switching logic 320 to switch the multiplexer 322 to the low latency data path 324, bypassing the link training elements and corresponding latency.

In a current embodiment, retimer registers are 8-bits wide and are accessed via 8-bit addresses. The PCIe base specification reserves addresses between 0xA0 and 0xFF for vendor defined functions. In at least one embodiment, Lane Margin Read commands (PCIe specification commands for reading information from the receiver 302) can target either the upstream Rx port of a first retimer or the upstream Rx port of a second retimer (see FIG. 2) individually. However, there is no Lane Margin Command for retimer register writes. Vendor registers are therefore read-only and cannot support write operations to set a low latency bit register. Embodiments of the present disclosure allow in-band switching between full and low latency data paths without writing or overwriting registry entries to record the current state. It may be appreciated that "in-band" switching refers to switching signals received in the data stream from the receiver 302, with no external control signals.

The in-band low latency switching logic 320 is configured to identify data in the received signal from the elastic buffer 308 indicating that the low latency data path 324 is appropriate. The in-band low latency switching logic 320 then reads the vendor register which returns the read-only bit value; the returned bit value sets the multiplexer 322 to the low latency data path 324. The low latency data path 324 then transfers all signals directly from the receiver 302 to the transmitter 318 until the multiplexer 322 is switched.

While signals continue to utilize the low latency data path 324, all signals are still processed through the training logic. Where each signal reaches the elastic buffer 308, the in-band low latency switching logic 320 is configured to identify data indicating new link training is necessary.

In at least one embodiment, the in-band low latency switching logic 320 includes a second vendor register indicating that the low latency data path 324 is inappropriate. The in-band low latency switching logic 320 then reads the second vendor register which returns the read-only bit value to set the multiplexer 322 to the standard link training data path. While the multiplexer 322 is in a low latency mode, the in-band low latency switching logic 320 continuously monitors the data stream (for example, via the elastic buffer 308) for a read vendor address signal. Upon identifying such a read vendor address signal, the in-band low latency switching logic 320 reads the second vendor address and applies a signal to the multiplexer 322, switching the multiplexer 322 to the standard data path.

The in-band low latency switching logic 320 may be embodied in solid state logic or implemented as a general-purpose processor configured to read data from the elastic buffer 308. The elastic buffer 308 may include data from the stream that would be otherwise discarded for link training purposes, but when read by the in-band low latency switching logic 320 triggers a read of a vendor register; the return code of the read operation instructs the multiplexer 322 to switch between the standard data path and the low latency data path 324. For example, PCIe includes functionality to include commands such as "access retimer register"; this command allows in-band read-only access of internal retimer registers. The in-band low latency switching logic 320, upon receiving such a read command, reads the indicated read-only register and utilizes the read value to set the multiplexer 322 to either the standard data path and the low latency data path 324. PCIe components may thereby instruct the retimer 300 to enter the low latency data path 324 without any out-of-band control signal.

In at least one embodiment, two read-only virtual registers in the retimer vendor address space are defined: Low Latency Mode Set (LLM_SET), and Low Latency Mode Clear (LLM_CLR). These virtual registers are used to set and clear a physical low latency mode register bit in the in-band low latency switching logic 320 used to control the multiplexer 322 via read side-effects. When the root complex issues a Lane Margin Read of LLM_SET, the in-band low latency switching logic 320 sets a bit to instruct the multiplexer 322 to enter low latency mode and return 0x01 in the read data to indicate that the request was successful; reporting successful or unsuccessful completion to the root complex is important to allow the root complex to manage the PCIe hierarchy and issue subsequent switching commands to the retimer 300 if necessary. When the root complex issues a Lane Margin Read of LLM_CLR, the in-band low latency switching logic 320 clears the bit to instruct the multiplexer 322 to exit low latency mode and return 0x00 in the read data. In at least one embodiment, the in-band low latency switching logic 320 includes a set of registers, each defined by the same register address as a corresponding vendor register address (that is to say overloaded). Overloaded vendor registers may be writable, while traditional vendor registers are not.

In at least one embodiment, an upstream component (e.g., upstream component 200 in FIG. 2) inserts a data packet or other such signal (a low latency mode entry signal) in stream via the receiver 302 to request a switch between the standard data path and the low latency data path 324. Return codes produced by the in-band low latency switching logic 320 may be reported to the root complex to indicate success or failure of such a switch. In at least one embodiment, these in-band requests and responses are made individually to both retimers 300 in a two-retimer configuration (retimers 204, 206 in FIG. 2).

In at least one embodiment, the low latency data path 324 may be used during a common clock mode of operation, and the traditional data path may be used during non-common clock mode operations, and during training.

In at least one embodiment, a downstream component (e.g., downstream component 202 in FIG. 2) may identify or report a threshold latency tolerance specific to the downstream component. The upstream component and in-band low latency switching logic 320 may prioritize the low latency data path 324 according to such threshold.

From the point-of-view of an out-of-band backend bus, the low latency mode is controlled by a register that is read/writable and allows an external host to enter and exit low latency mode directly.

Embodiments of the present disclosure implement a heretofore unknown improvement to the operation of devices including PCIe retimers. Such devices include computing devices with PCIe based graphics cards, solid state drives, cards implementing redundant arrays of independent disks (RAID), Wi-Fi cards, and any other primary or peripheral components utilizing PCIe.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A PCIe retimer comprising:
an elastic buffer;
a link training and status state machine;
a multiplexer; and
switching logic in data communication with the elastic buffer and the multiplexer, the switching logic comprising:
a first register configured with a first bit value;
a second register configured with a second bit value; and
processing logic configured to:
identify a read signal from the elastic buffer, the read signal configured to instruct the switching logic to read one of the first register or the second register;
read the register indicated by the read signal; and
apply a signal to the multiplexer corresponding to the first bit value or the second bit value depending on which of the first register or second register was read,
wherein:
the first bit value puts the multiplexer in a configuration to utilize the link training and status state machine; and
the second bit value puts the multiplexer in a configuration to bypass the link training and status state machine;
wherein the PCIe retimer is configured to receive a first signal and boost the first signal by regenerating the first signal as a second signal.

2. The PCIe retimer of claim 1, wherein the switching logic further comprises:
a first overload register having a register address corresponding to the first register; and
a second overload register having a register address corresponding to the second register.

3. The PCIe retimer of claim 1, wherein the processing logic is further configured to:
receive a signal from an upstream component instructing the PCIe retimer to enter a low latency mode; and
populate the elastic buffer with the received signal to instruct the switching logic to put the multiplexer in the configuration to bypass the link training and status state machine.

4. The PCIe retimer of claim 3, wherein the received signal comprises a Lane Margin read command.

5. The PCIe retimer of claim 1, wherein the processing logic is further configured to return a return code to a root complex based on a success or failure to apply the signal to the multiplexer.

6. The PCIe retimer of claim 1, wherein the processing logic is further configured to:
continuously monitor the elastic buffer for a read signal while the multiplexer is in a low latency mode;
identify a read signal configured to instruct the switching logic to read the first register; and
apply a signal to the multiplexer corresponding to the first bit value, wherein the read signal is delivered entirely in-band.

7. The PCIe retimer of claim 1, wherein the signal to the multiplexer comprises a read value returned when reading the vendor address corresponding to the vendor address signal.

8. A PCIe device comprising a retimer configured to receive a first signal and boost the first signal by regenerating the first signal as a second signal, the retimer comprising:
a receiver;
a transmitter; and
a PCIe retimer comprising:
an elastic buffer;
a link training and status state machine;
a multiplexer; and
switching logic in data communication with the elastic buffer and the multiplexer, the switching logic comprising:
a first register configured with a first bit value;
a second register configured with a second bit value; and
processing logic configured to:
receive a low latency mode entry/exit signal via the receiver;
populate the elastic buffer with the low latency mode entry/exit signal;
identify a low latency mode entry/exit signal from the elastic buffer, the low latency mode entry/exit signal configured to instruct the switching logic to read one of the first register or the second register;
read register indicated by the low latency mode entry/exit signal;
apply a signal to the multiplexer corresponding to the first bit value or the second bit value based on the low latency mode entry/exit,
wherein:
the first bit value puts the multiplexer in a configuration to utilize the link training and status state machine; and
the second bit value puts the multiplexer in a configuration to utilize a low latency data path directly linking the receiver to the transmitter.

9. The PCIe device of claim 8, wherein the switching logic further comprises:
a first overload register having a register address corresponding to the first register; and
a second overload register having a register address corresponding to the second register.

10. The PCIe device of claim 8, wherein the low latency mode entry/exit signal comprises a Lane Margin read command.

11. The PCIe device of claim 8, wherein the processing logic is further configured to return a return code to a root complex based on a success or failure to apply the signal to the multiplexer.

12. The PCIe device of claim 8, wherein the processing logic is further configured to:
continuously monitor the elastic buffer for a low latency mode entry/exit signal while the multiplexer is in a low latency mode;
identify a low latency mode entry/exit signal corresponding to the first register; and
apply a signal to the multiplexer corresponding to the first bit value,
wherein the low latency mode entry/exit signal is delivered entirely in-band.

13. The PCIe device of claim 8, wherein the signal to the multiplexer comprises a read value returned when reading the vendor address corresponding to the vendor address signal.

14. A system comprising:
   a first device including a PCIe interface;
   a second device including a PCIe interface; and
   a PCIe retimer electronically interposed between the first device and the second device, the PCIe retimer being configured to receive a first signal from the first device and boost the first signal by regenerating the first signal as a second signal, the second signal being output to the second device, the PCIe retimer comprising:
      an elastic buffer;
      a link training and status state machine;
      a multiplexer; and
      switching logic in data communication with the elastic buffer and the multiplexer, the switching logic comprising:
         a first register configured with a first bit value;
         a second register configured with a second bit value; and
         processing logic configured to:
            identify a read signal from the elastic buffer, the read signal configured to instruct the switching logic to read one of the first register or second vendor address;
            read the register corresponding indicated by the read signal;
            apply a signal to the multiplexer corresponding to the first bit value or the second bit value based on the read signal,
         wherein:
            the first bit value puts the multiplexer in a configuration to utilize the link training and status state machine; and
            the second bit value puts the multiplexer in a configuration to bypass the link training and status state machine.

15. The system of claim 14, wherein the switching logic further comprises:
   a first overload register address corresponding to the first register; and
   a second overload register address corresponding to the second register.

16. The system of claim 14, wherein the processing logic is further configured to:
   receive a signal from the first device instructing the PCIe retimer to enter a low latency mode; and
   populate the elastic buffer with the received signal.

17. The system of claim 16, wherein the low latency mode entry signal comprises a Lane Margin read command.

18. The system of claim 14, wherein the processing logic is further configured to return a return code to a root complex based on a success or failure to apply the signal to the multiplexer.

19. The system of claim 14, wherein the processing logic is further configured to:
   continuously monitor the elastic buffer for a read signal while the multiplexer is in a low latency mode;
   identify a read signal corresponding to the first register; and
   apply a signal to the multiplexer corresponding to the first bit value,
   wherein the read signal is delivered entirely in-band.

20. The system of claim 14, wherein the signal to the multiplexer comprises a read value returned when reading the register address corresponding to the read signal.

* * * * *